US012747627B2

(12) United States Patent
Ladani et al.

(10) Patent No.: US 12,747,627 B2

(45) Date of Patent: Sep. 29, 2026

(54) AUTOMATED PET ENTRY SYSTEM

(71) Applicants: Shruti Narottambhai Ladani, Newark, CA (US); Hemal Rameshbhai Meghpara, Newark, CA (US); Mitul Dilipbhai Modi, Cupertino, CA (US)

(72) Inventors: Shruti Narottambhai Ladani, Newark, CA (US); Hemal Rameshbhai Meghpara, Newark, CA (US); Mitul Dilipbhai Modi, Cupertino, CA (US)

( * ) Notice: Subject to any disclaimer, the term of this patent is extended or adjusted under 35 U.S.C. 154(b) by 0 days.

(21) Appl. No.: 18/903,635

(22) Filed: Oct. 1, 2024

(65) Prior Publication Data

US 2025/0257608 A1 Aug. 14, 2025

Related U.S. Application Data

(60) Provisional application No. 63/553,571, filed on Feb. 14, 2024.

(51) Int. Cl.

*E06B 7/32* (2006.01)

*G07C 9/00* (2020.01)

(52) U.S. Cl.

CPC ............ *E06B 7/32* (2013.01); *G07C 9/00896* (2013.01); *G07C 2009/00769* (2013.01)

(58) Field of Classification Search

CPC .................. E06B 7/32; G07C 9/00896; G07C 2009/00769

See application file for complete search history.

(56) References Cited

U.S. PATENT DOCUMENTS

| | | | | |
|---|---|---|---|---|
| 2005/0133701 | A1 * | 6/2005 | Anderson ............ | A01K 29/005 250/221 |
| 2011/0147455 | A1 * | 6/2011 | Mok ...................... | G06K 17/00 235/439 |
| 2024/0023521 | A1 * | 1/2024 | Schroeder ............ | A01K 11/006 |

FOREIGN PATENT DOCUMENTS

JP 2000057276 A * 2/2000

* cited by examiner

*Primary Examiner* — James J Yang

(74) *Attorney, Agent, or Firm* — Ariel S. Bentolila; Bay Area IP Group

(57) ABSTRACT

A pet entry system and process including determining if a sensor or button has been triggered or activated; activating or waking at least one processor if at least one sensor or button has been triggered or activated; scanning for a wireless key signal; receiving a wireless key signal from a tag; validating or authenticating the wireless key signal received from the tag; evaluating a distance of the tag to the wireless key receiver if the received wireless key signal is valid; confirming if the distance of the tag is within a predetermined distance or proximity range and the wireless key signal is valid; sending a door open to a door controller if the tag is within the predetermined distance or proximity range; and ending the scanning for wireless key signal.

20 Claims, 5 Drawing Sheets

AUTOMATED PET ENTRY SYSTEM

CROSS-REFERENCE TO RELATED APPLICATIONS

The present Utility patent application claims priority benefit of the U.S. provisional application for patent Ser. No. 63/553,571 entitled "AUTOMATED PET ENTRY SYSTEM", filed on 14 Feb. 2024, under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to entry systems. More particularly, certain embodiments of the invention relate to pet entry systems.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Many pet owners have to let their pets outside the home to get exercise, defecate, urinate, etc. Some pet owners may not always be present or available to let their pets outside the home or back indoors. This may occur, for example, when the pet owner is at work or when the pet owner is sleeping during the night. To address these situations, some pet owners have installed pet doors in their homes to enable the pet to enter and exit the home without the need for the owner to be present.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that typical pet doors may include a flap that is installed on a lower portion of a door that allows pets to enter and exit a home. Some pet doors with flexible flaps are held in place by a frame through the door, with the animal entering and exiting the premises by pushing on the flap. In some instances, it may be difficult to train the pet to push against the flap, leaving the problem of either keeping the flap open or not using the flap type pet door. Conventional pet doors may also allow other animals to enter or exit through the pet door, including wild animals or other pets such as stray dogs, cats, skunks, squirrels, raccoons and other rodents who may enter the home by merely pushing on the flap. Installing these flap doors may also affect the resale value of a home, particularly when selling to buyers who do not own pets.

Conventional wireless key systems usually work on only one level of authentication and there are only two components involved. One is the transmitter key and another is the receiver decoder. Commonly known as keyless entry systems. This causes problems when key is in the close range but there is no need to unlock or open the door. The action may be performed regardless of the need and causes false positive scenario. This may apply to the pets specially when they wear the key but wants to play or laydown near a close-range area resulting in the door being left open or keeps opening and closing continuously. Sometimes even if the pet just passes by the close range, the door opens where actually there is no need. To avoid this problem, the receiver decoder has to make sure of the presence of the key in the close range for a few seconds to ignore the accidental detection. This solution does not resolve the scenario where the pet lays down in the close-range scenario.

With traditional Proximity sensors, Motion detecting Cameras, Push button systems, Weight sensor-based floor mats, etc., any intruder or stray/wild animals may also gain the unauthorized access. Weight sensor-based trigger makes it hard for small breed dogs or cats to trigger the sensor and wild animals can also trigger the sensor without secondary way of authorization.

In some camera-based systems in the market, the pet detection is provided but these systems have very low accuracy and can't differentiate between cats and racoons, or coyotes and dogs. It makes even hard to detect pets in low light environments.

Typical Bluetooth beacon-based systems may detect the presence of transmitters based on wireless signal strength or Received Signal Strength Indicator value (RSSI value). These systems have limitations in accurately detecting wireless signal strength variations from outside or inside a home and making the pet presence detection more complicated. On top of that some pets likes to watch through the glass doors or sleep near the doors. This may make it impossible to detect false positive if the pet really wants to open the door or not.

Tesla uses similar methods to unlock a car by detecting a signal from a user phone and unlocks the car when a user is present in the close-range. This sometimes unlocks the car even if the user is just walking nearby the car but does not want to unlock the car. Usage of the key less system in cars is not much of the issue once the user exits the car and walk away from the car. But for residential environments, pass by events occur more often and the door unlock or open events may happen more frequently.

In view of the foregoing, it is clear that these traditional techniques are not perfect and leave room for more optimal approaches.

BRIEF DESCRIPTION OF THE DRA WINGS

The present invention is illustrated by way of example, and not by way of limitation, in the figures of the accompanying drawings and in which like reference numerals refer to similar elements and in which.

Figure 1:
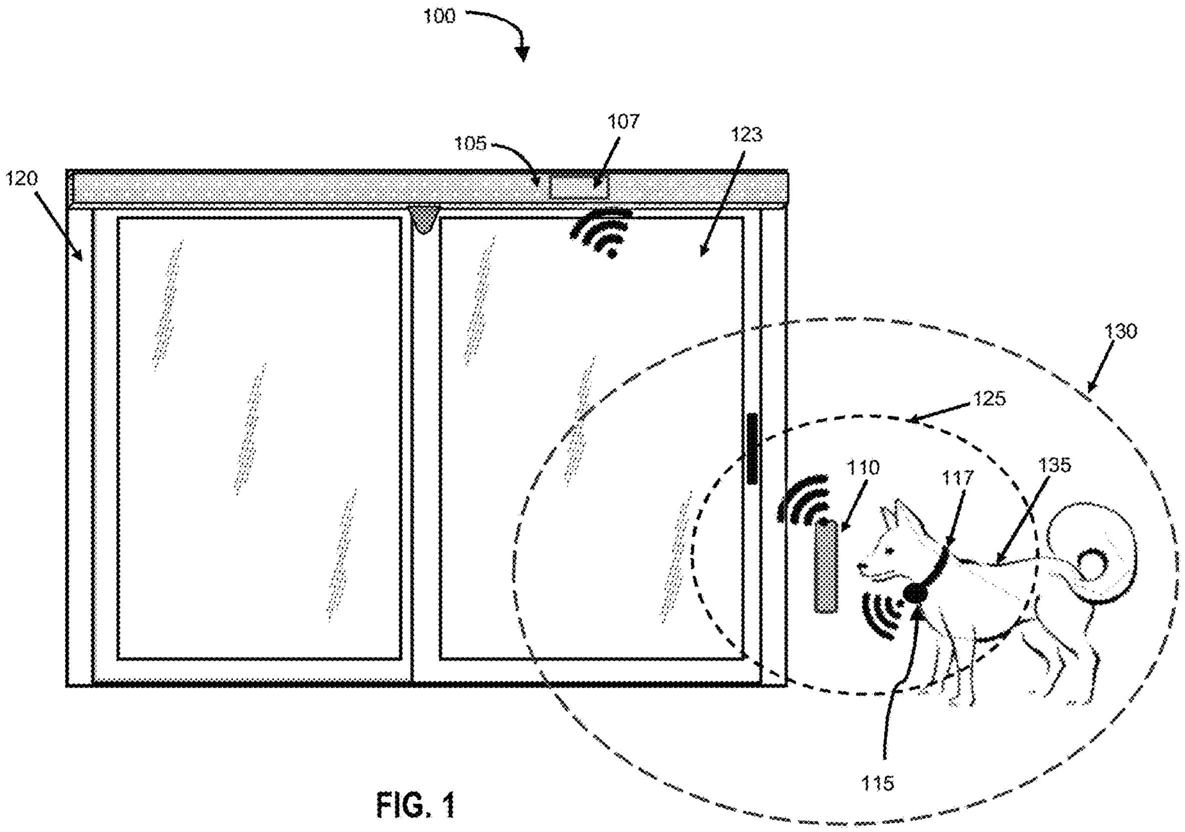
FIG. 1 is an illustration of an exemplary pet entry system, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see *Ex parte Mallory,* 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc. v. Roadway Safety Servs., Inc., Civ. App.* 96-1264, slip op. at 10 (Fed. Cir. Jul. 3, 1997) (unpublished) *Hybridtech v. Monoclonal Antibodies, Inc.,* 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co. v. Industrial Crating & Packing, Inc.,* 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See *In re Frye, Appeal No.* 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C. v. Vector Distribution Sys., Inc.,* 347 F.3d 1314, 1323 (Fed. Cir. 2003) (recognizing the "dual ordinary meaning of th[e] term [" substantially "] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp.*

*v. American Axle & Manufacturing, Inc., Civ. App.* 04-1116, 2004 *U.S. App. LEXIS* 18265, *13-14 (Fed. Cir. Aug. 27, 2004) (unpublished). The term "substantially" is commonly used by claim drafters to indicate approximation. See *Cordis Corp. v. Medtronic AVE Inc.,* 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC v. Vector Distribution Sys., Inc.,* 347 F.3d 1314, 1322 (Fed. Cir. 2003); *Epcon Gas Sys., Inc. v. Bauer Compressors, Inc.,* 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp. v. Vaughan Co.,* 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp. v. Medtronic AVE, Inc.,* 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems v. Rockwood Retaining Walls, Inc.,* 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C. v. Vector Distrib. Sys., Inc.,* 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon,* 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc. v. Bauer Compressors, Inc.,* 279 F.3d 1022 (Fed. Cir. 2002) (construing the terms "substantially constant" and "substantially below"); *Zodiac Pool Care, Inc. v. Hoffinger Indus., Inc.,* 206 F.3d 1408 (Fed. Cir. 2000) (construing the term "substantially inward"); *York Prods., Inc. v. Cent. Tractor Farm & Family Ctr.,* 99 F.3d 1568 (Fed. Cir. 1996) (construing the term "substantially the entire height thereof"); *Tex. Instruments Inc. v. Cypress Semiconductor Corp.,* 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek,* 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp. v. Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp. v. Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC v. Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp. v. Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc. v. Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc. v. Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp. v. Micron Seps.,* 66 F.3d 1211, 1217, 36 USPQ2d 1225, 1229 (Fed. Cir. 1995); see, e.g., *Andrew Corp. v. Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory,* 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re *Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them-Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C . . . sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that may be capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks may be performed by local and remote processing devices that may be linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein may be implemented in an operating environment comprising computer-executable instructions (e.g., software) installed on a computer, in hardware, or in a combination of software and hardware. The computer-executable instructions may be written in a computer programming language or may be embodied in firmware logic. If written in a programming language conforming to a recognized standard, such instructions may be executed on a variety of hardware platforms and for interfaces to a variety of operating systems. Although not limited thereto, computer software program code for carrying out operations for aspects of the present invention may be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer may read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and may be merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" may include generic structure (e.g., generic circuitry) that may be manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that may be adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media may be any available media that may be accessed by a general purpose or special purpose computer, including the functional design of any special purpose processor as discussed above. By way of example, and not limitation, such non-transitory computer-readable media may include RAM, ROM, EEPROM, CD-ROM or other optical disk storage, magnetic disk storage or other magnetic storage devices, or any other medium which may be used to carry or store desired program code means in the form of computer-executable instructions, data structures, or processor chip design. When information may be transferred or provided over a network or another communications connection (either hardwired, wireless, or combination thereof) to a computer, the computer properly views the connection as a computer-readable medium. Thus, any such connection may be properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor-based memory, phase change memory, optical memory, periodically refreshed memory, and the like; the non-transitory computer readable medium, however, does not include a pure transitory signal per se; i.e., where the medium itself may be transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention and variations thereof, relate to pet entry systems. The present invention will now be described in detail with reference to embodiments thereof as illustrated in the accompanying drawings.

FIG. 1 is an illustration of an exemplary automated pet entry system 100, in accordance with an embodiment of the present invention. In one embodiment of the present invention, the system may include, without limitation, a door 123 installed in a door frame 120, a door controller device 105 that opens or closes door 123, a trigger device 110, a pet tag device 115 attached on a pet collar 117. Door controller 105 may include, without limitation, a signal receiver 107. Trigger device 110 may be wall mounted and may include a touch or button sensor for detecting a pet's 135 intention. In some embodiment, trigger device 110 may further include a touch, proximity, distance, or motion sensor with detection range less than about 10 centimeters distance. Trigger device 110 may communicate with door controller 105 in a wired or wireless fashion and receives wireless signals from pet tag device 115. Inner dash lines indicate within-detection-range zone 125 and outer dash lines indicate out-of-detection range zone 130 respectively, of the pet tag signal strength. The same trigger device 110 can be installed outside of the door to let the pet open the door from outside to get inside.

Trigger device 110 may include, without limitation, a reader identifying a tagged pet or object. Pet tag 115 may include active or passive RFID tags such as, not a limitation, a beam-powered tag which is a passive device that receives energy required for operation from the radio waves generated by Trigger device 110. Alternatively, Pet tag 115 can be battery powered Bluetooth, WiFi and/or any wireless transmitting device. The pet tag or beam powered tag substantially rectifies an EM field and fundamentally creates a change in reflectivity of the field (e.g. inner dash lines indicating within-detection-range 125 and outer dash lines indicate out-of-detection range 130) which is reflected to and read by trigger device 110. In other embodiments, a battery-powered semi-passive tag 115 also receives and reflects EM waves from the trigger device. In some embodiments, a battery powered tag 115 includes a battery to power the pet tag independent of receiving power from the trigger device. In further embodiments, an active tag 115 actively transmits EM waves which are then received by the trigger device.

In use, the system may detect a pet 135 presence and intention when the pet presses switch or button of trigger device 110 with paws or nose and a secondary authentication with pet tag 115 that transmits a wireless key for added security. The pet's action makes the pet's intention clear if the pet really wants to operate the door or not, to go outside or come inside the home as the pet pleases.

Trigger device 110 may be installed in a low traffic area where trigger device 110 is not triggered unintentionally. Within-detection-range 125 and out-of-detection range 130 are designated for wireless signal detection range. In the present embodiment, referring to FIG. 4, proximity 402, or motion sensor 404 field of view may be fixed by the design of device 110. Some alternate embodiments may be implemented in which the field of view may be adjustable. For example, without limitation, in some such embodiments, the proximity and motion sensors may see only down an area that can be triggered by the legs of the pet but out-of-detection range zone to reduce false triggers as well as save battery power for not detecting wide areas adjacent to the device. In the present embodiment, the touch sensor 401, proximity sensor 402, or motion sensor 404 may replace the button press to start the trigger for wall mounted trigger device 110 to start listening for wireless key signals from tag 115 worn by the pet.

The various devices in the system are designed to be battery operated and a standalone Transmitter/Receiver device where the devices spend most of the time in sleep mode where it uses bare minimum power. With the system design, battery life expectancy is more than a year or even couple of years as well as no need for DC power supply to make the device installation suitable for indoor and outdoor uses. Being battery operated gives more flexibility for the installation.

There may be a scenario when the button is pressed on trigger or Button/Switch device 110 but the pet may be in out-of-detection range or out of range zone 130 and the wireless signal may be received from pet tag device 115. In this case, trigger or Button/Switch device 110 may check the signal strength of pet tag device 115 to determine the approximate distance of pet tag device 117 and may ignore the wireless signal for being in out-of-detection range zone 130. Trigger or Button/Switch device 110 may send an open-door command if pet tag 115 is within-detection-range or within close range zone 125 of the trigger device. The signal transmitted by the pet tag device 115 may be encrypted and trigger device 110 may need to decode the signal for the authenticity of the pet tag device. Upon successful detection and authentication of pet tag device 115 within close range or within-detection-range zone 125, device 110 may send a (encrypted or unencrypted) command wirelessly to door controller device 105 via door controller signal receiver 107 responsible for opening or closing the door or taking other predetermined actions.

Figure 2:
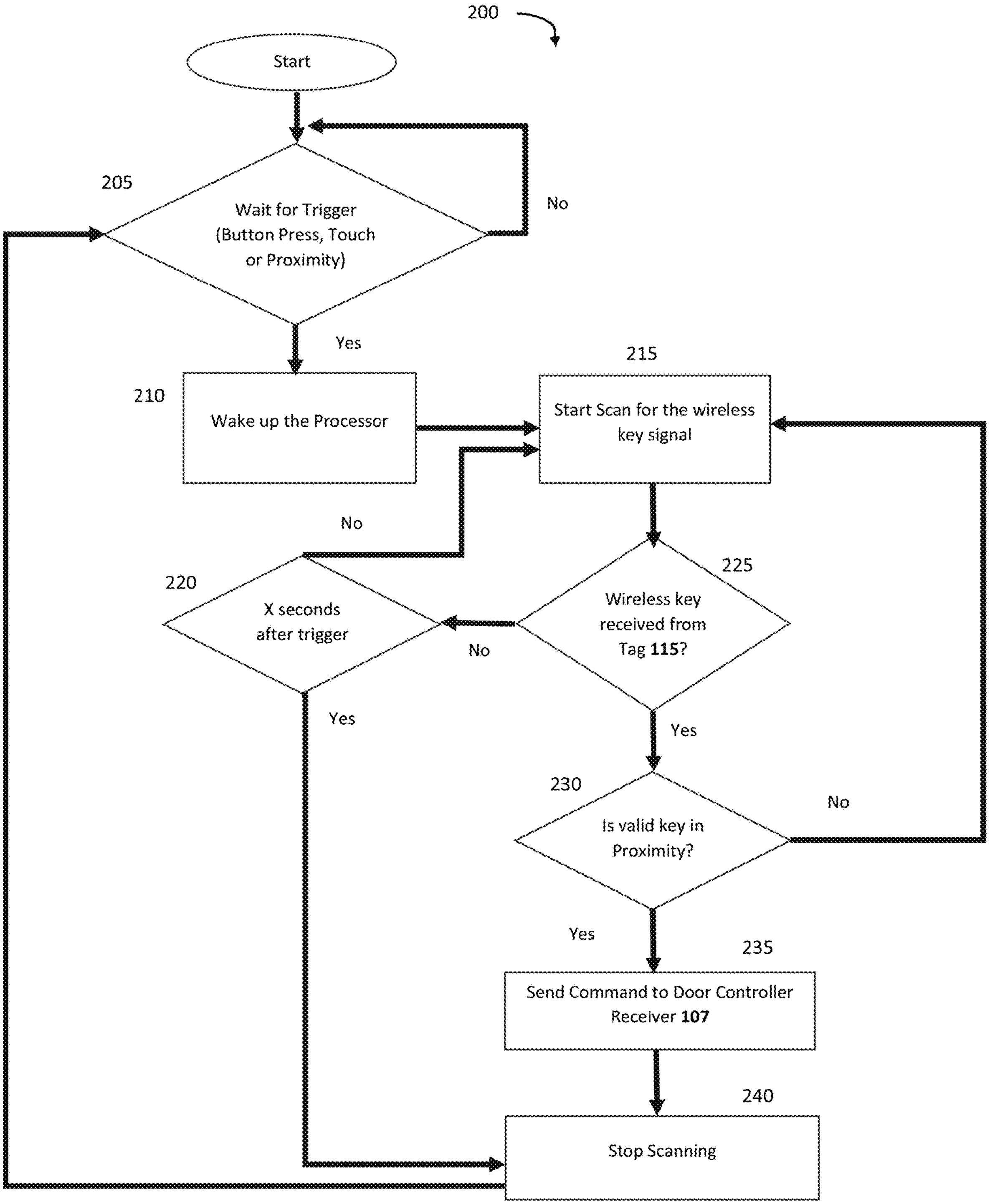
FIG. 2 is an exemplary flowchart showing a process of using a pet entry system, in accordance with an embodiment of the present invention.

FIG. 2 is an exemplary flowchart showing a process flow of using an automated pet entry system 100, in accordance with an embodiment of the present invention. Referring to FIG. 1 and FIG. 2, in a Step 205, pet may activate trigger device 110, signaling or communicating an intention of the pet to go out if the trigger device is installed indoor and to go out if the trigger device is installed outdoor. For example, referring to FIG. 1 and FIG. 4, to go outdoor, pet may press a button 403, get in contact with a touch sensor 401, movement is detected by a motion sensor 404 and/or within proximity detected by a proximity sensor 402. In a Step 210, the processor may wake up from sleep due to a trigger from Step 205 to take further action. The trigger may include a button press, a touch, a movement, and/or a proximity of a pet tag. In a Step 215, trigger device 110 starts listening/ scanning for the wireless key signal from the signal transmitter of pet tag 115 attached to pet's collar 117 for a few seconds. In a Step 225, trigger device 110 determines if the wireless key signal is received and performs an authentication or validation process. If the wireless key signal is valid or authentic, in a Step 230, trigger device 110 determines the distance of the wireless key signal coming from the pet tag signal transmitter 115 from Received Signal Strength Indicator (RSSI) value. If the wireless key signal is invalid or valid but out-of-detection range 130 (e.g. lower in RSSI value), the button press is ignored and goes back to listening for the wireless key in Step 215. Trigger device 110 may stop scanning in a Step 240 and goes back to sleep mode after a predetermined amount of elapsed time (e.g. few seconds) is reached, of not receiving an authentic wireless key signal in a Step 220. The measured elapsed time may be compared to a stored predetermined amount of elapsed time in a memory of the trigger device.

This type of scenario happens when, for example, without limitation, another pet with a tag 115 having a different key or a wild animal with no tag 115 bump into the button or touches a sensor to trigger Step 210. If the wireless key signal is valid or authentic and in proximity and/or within-detection-range 125 in Step 230, then in a Step 235, an open command signal and a few parameters like RSSI of the received signal from pet tag 115 (data can be encrypted or unencrypted) is sent to door controller Receiver 107 for controller 105 to open the door. In further embodiments, door controller 105 may check the wireless key signal again for validity and other extra parameters received from pet tag 115. If the wireless key signal and other parameters are valid, the door opens accordingly. If the wireless key signal is invalid, ignore the open command received by receiver module 107 and do not open the door. In a Step 240, trigger device 110 stops scanning or listening. In a Step 205, trigger device 110 goes back to sleep/low power mode and waits for the Trigger again.

Authentication can be any of but not limited to asymmetric or symmetric key exchanged at the initial paring of tag 105. It can be any of RSA, ECC, AES128, AES256, or any new algorithm.

The distance of pet tag 105 to trigger device 110 can be measured from Bluetooth tag RSSI (Received Signal Strength Indicator). RSSI is often expressed in decibels (db) or as a percentage between 1-100, and can be positive or negative. A higher RSSI value indicates a stronger signal, and a closer value to zero is better. Within-detection-range zone 125 indicates RSSI of closer range and out-of-detection range zone 130 indicates RSSI of value away from zero. For example, Zone 125, RSSI may be between 0 to −45 db or lower and Zone 130 may be −45 db or higher. Zone 125 based on −45 db distance may be approximately one (1) ft from trigger device 110. The distance may vary based on device 110 and Pet Tag 115 receiver and transmitter antenna types and transmission power. Zone 125 parameter may be set by any or both of the Door controller 107 or Device 110. The actual distance may vary based on transmitter tag 115 and receiver device 110, and may not map exactly the same with decibel values.

Wireless signal from Tag 115 may include, without limitation, parameters like Tag Id, secret token for authentication, time, etc. The signal transmitted from device 110 may have all the parameters received from Tag 115 plus Device 110 Id, RSSI of the signal received from Tag 115, secret token for authentication, time received, etc. There can be more or less parameters that can be easily determined by any person with ordinary skills in the area of secured wireless transmissions.

In some embodiments, there may be two (2) buttons installed for the complete system. One button may be installed outside door 123 to open the door from the outside such as when the pet wants to go inside the house. Another button may be installed inside to open the door for the pet to go outside.

Figure 3:
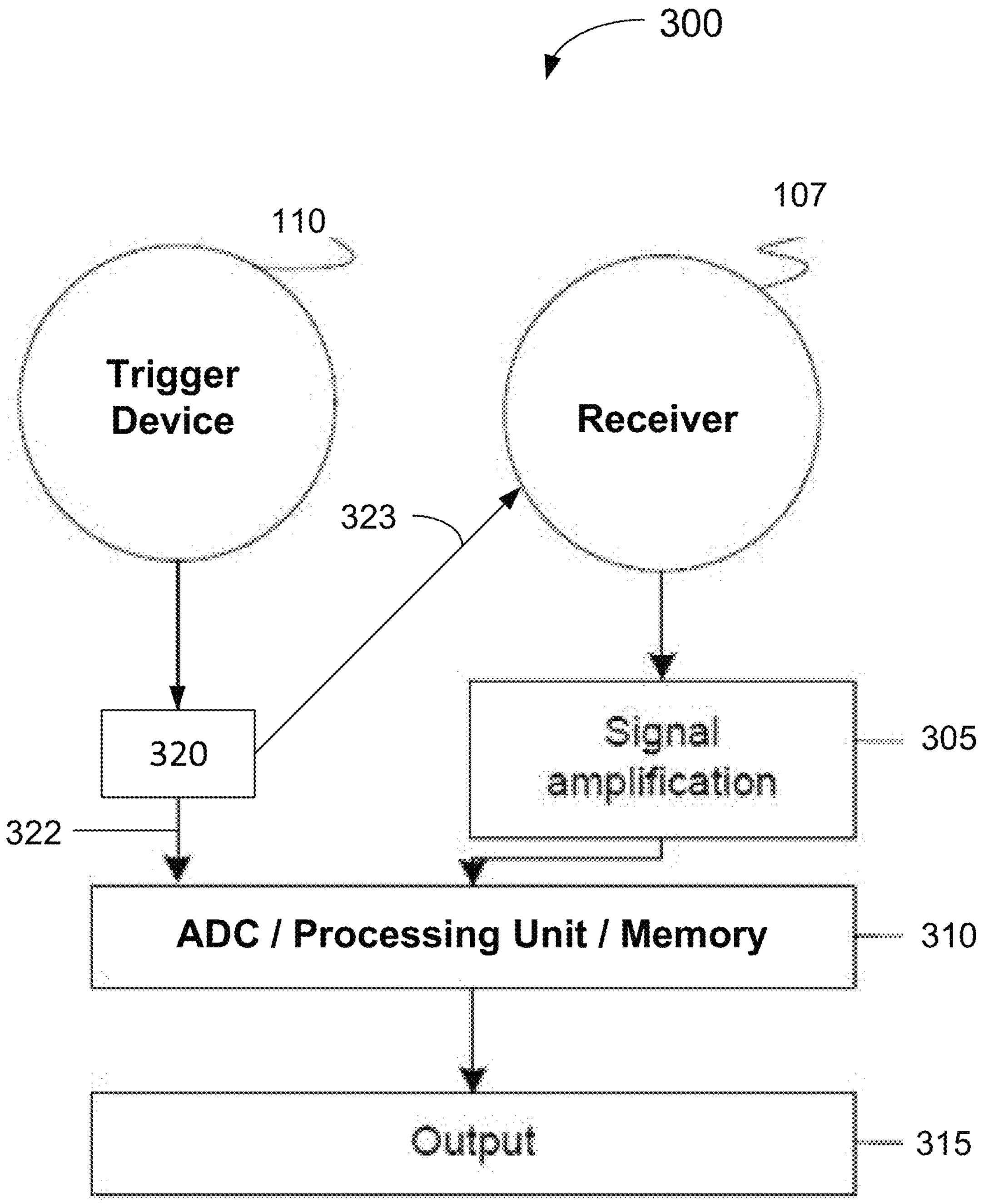
FIG. 3 is an exemplary diagram illustrating a door controller, in accordance with an embodiment of the present invention.

FIG. 3 is an exemplary diagram illustrating a door controller 105, in accordance with an embodiment of the present invention. In one embodiment of the present invention, referring to FIG. 1 and FIG. 3, door controller 105 may communicate with Trigger Device 110 via communication channel 320. Communication channel 320 may include a wired (path 322) or wireless (path 323) communication medium. Door controller 105 may include, not a limitation, receiver module 107, signal amplification module 305, analog to digital converter (ADC) module, processing unit, and memory 310, and output module 315. Analog to digital converter (ADC) module, processing unit, and memory 310 may be embedded in a circuit board. Processing Unit 310 will take further action on the signal received from trigger device 110 in Step 235. Processing unit may be configured to receive and process the converted signals and the memory may be used to store allowable wireless key signals for comparison with incoming wireless key signals. Output module 315 may receive, not a limitation, an open or close command from the processing unit. Output module 315 may include means for opening and closing door 123 such as, not a limitation, motor and gears. Door controller 105 may be AC, DC or battery powered.

Figure 4:
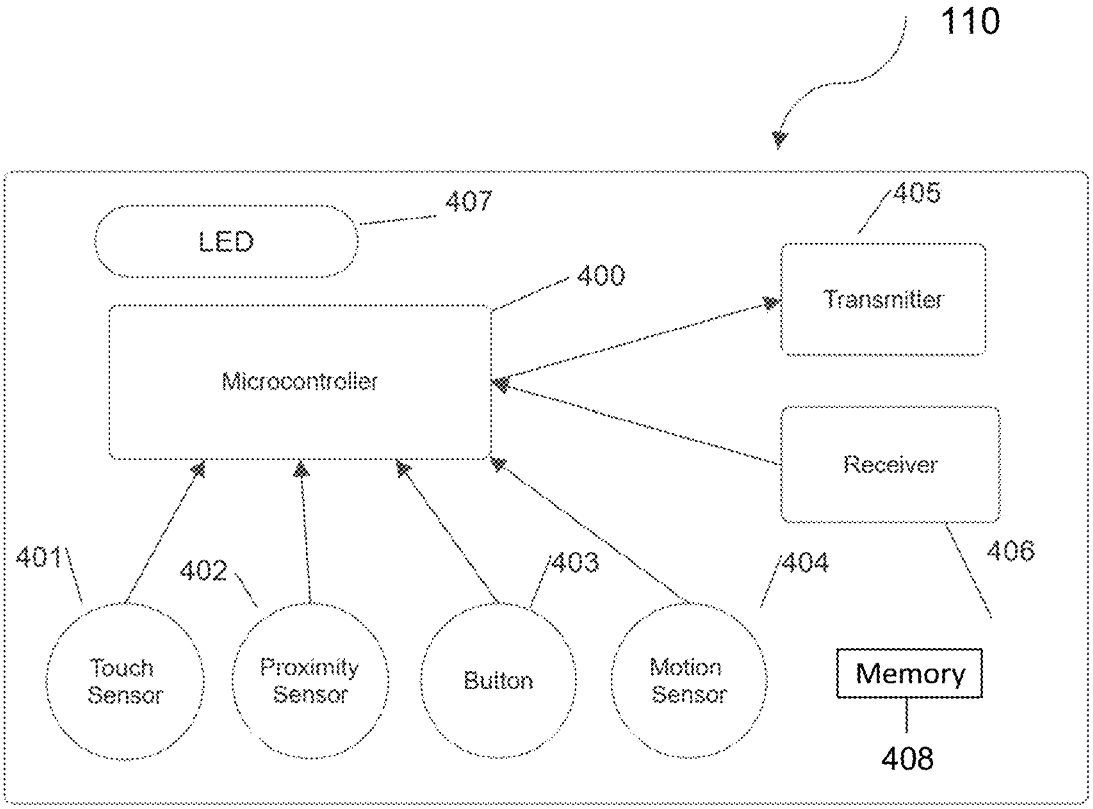
FIG. 4 is an exemplary diagram illustrating a trigger device, in accordance with an embodiment of the present invention.

FIG. 4 is an exemplary diagram illustrating a trigger or Button/Switch device 110, in accordance with an embodiment of the present invention. Referring to FIG. 2 and FIG. 4, trigger device 110 may include, without limitation, Touch Sensor 401, Proximity Sensor 402, Push Button 403, Motion Sensor 404 to detect the first trigger event in Step 205. Upon activation of any of the sensors and/or button, Microcontroller 400 wakes from sleep/standby and enables Receiver 406 to listen for the wireless key signal from Tag 115 in Step 210. After all authentication of the valid wireless key signal and proper RSSI in Step 230, Microcontroller 400 may transmit the Door open command to Door Controller receiver 107 in Step 235. LED 407 may be used to indicate the status of authentication for visual notification for the Trigger event in Step 205 and/or the indication of successful sending of the Open command in Step 235. Memory 408 may be an integral part and/or external part of microcontroller 400. Memory 408 may store, without limitation, one or more allowed wireless key(s), authentication or validation processes, elapse time after the trigger event of Step 220, time and date when door is opened/closed, RSSI values, within-detection-range zone 125 and out-of-detection range zone 130 values, Tag Id, secret token for authentication, time, etc.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. Such computers referenced and/or described in this disclosure may be any kind of computer, either general purpose, or some specific purpose computer such as, but not limited to, a workstation, a mainframe, GPU, ASIC, etc. The programs may be written in C, or Java, Brew or any other suitable programming language. The programs may be resident on a storage medium, e.g., magnetic or optical, e.g., without limitation, the computer hard drive, a removable disk or media such as, without limitation, a memory stick or SD media, or other removable or non-removable medium. The programs may also be run over a network, for example, with a server or other machine sending signals to the local machine, which allows the local machine to carry out the operations described herein.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

Figure 5:
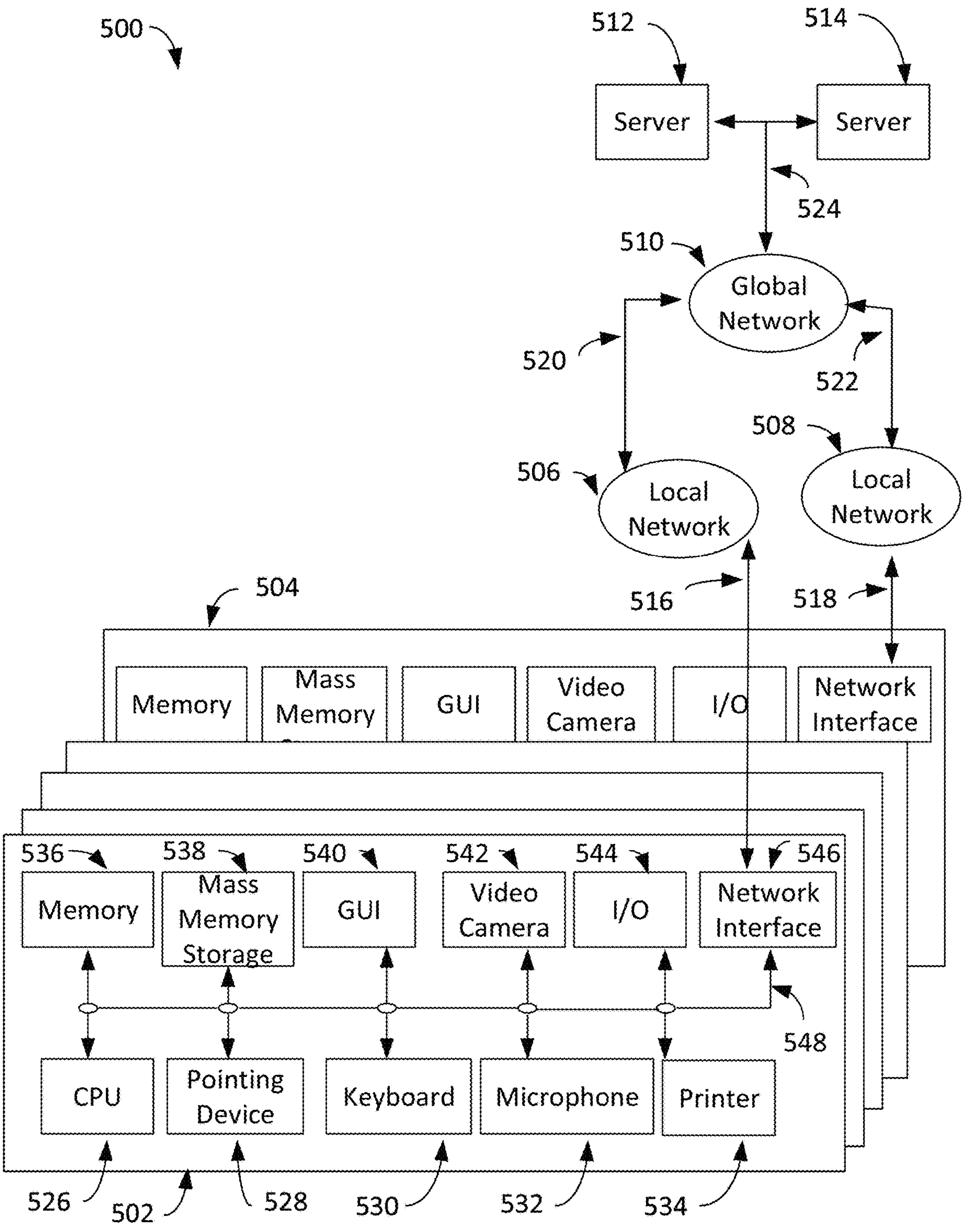
FIG. 5 is a block diagram depicting an exemplary client/server system which may be used by an exemplary web-enabled/networked embodiment of the present invention.

FIG. 5 is a block diagram depicting an exemplary client/server system which may be used by an exemplary web-enabled/networked embodiment of the present invention.

A communication system 500 may include, without limitation, a multiplicity of clients with a sampling of clients denoted as a client 502 and a client 504, a multiplicity of local networks with a sampling of networks denoted as a local network 506 and a local network 508, a global network 510 and a multiplicity of servers with a sampling of servers denoted as a server 512 and a server 514.

Client 502 may communicate bi-directionally with local network 506 via a communication channel 516. Client 504 may communicate bi-directionally with local network 508 via a communication channel 55. Local network 506 may communicate bi-directionally with global network 510 via a communication channel 520. Local network 508 may communicate bi-directionally with global network 510 via a communication channel 522. Global network 510 may communicate bi-directionally with server 512 and server 514 via a communication channel 524. Server 512 and server 514 may communicate bi-directionally with each other via communication channel 524. Furthermore, clients 502, 504, local networks 506, 508, global network 510 and servers 512, 514 may each communicate bi-directionally with each other.

In one embodiment, global network 510 may operate as the Internet. It will be understood by those skilled in the art that communication system 500 may take many different forms. Non-limiting examples of forms for communication system 500 include local area networks (LANs), wide area networks (WANs), wired telephone networks, wireless networks, or any other network supporting data communication between respective entities.

Clients 502 and 504 may take many different forms. Non-limiting examples of clients 502 and 504 include personal computers, personal digital assistants (PDAs), cellular phones and smartphones.

Client 502 may include, without limitation, a CPU 526, a pointing device 528, a keyboard 530, a microphone 532, a printer 534, a memory 536, a mass memory storage 538, a GUI 540, a video camera 542, an input/output interface 544 and a network interface 546.

CPU 526, pointing device 528, keyboard 530, microphone 532, printer 534, memory 536, mass memory storage 538, GUI 540, video camera 542, input/output interface 544 and network interface 546 may communicate in a unidirectional manner or a bi-directional manner with each other via a communication channel 548.

Communication channel 548 may be configured as a single communication channel or a multiplicity of communication channels.

CPU 526 may be comprised of a single processor or multiple processors. CPU 526 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 536 is used typically to transfer data and instructions to CPU 526 in a bi-directional manner. Memory 536, as discussed previously, may include any suitable computer-readable media, intended for data storage, such as those described above excluding any wired or wireless transmissions unless specifically noted. Mass memory storage 538 may also be coupled bi-directionally to CPU 526 and provides additional data storage capacity and may include any of the computer-readable media described above. Mass memory storage 538 may be used to store programs, data and the like and is typically a secondary storage medium such as a hard disk. It may be appreciated that the information retained within mass memory storage 538, may, in appropriate cases, be incorporated in standard fashion as part of memory 536 as virtual memory.

CPU 526 may be coupled to GUI 540. GUI 540 enables a user to view the operation of computer operating system and software. CPU 526 may be coupled to pointing device 528. Non-limiting examples of pointing device 528 include computer mouse, trackball and touchpad. Pointing device 528 enables a user with the capability to maneuver a computer cursor about the viewing area of GUI 540 and select areas or features in the viewing area of GUI 540. CPU 526 may be coupled to keyboard 530. Keyboard 530 enables a user with the capability to input alphanumeric textual information to CPU 526. CPU 526 may be coupled to microphone 532. Microphone 532 enables audio produced by a user to be recorded, processed and communicated by CPU 526. CPU 526 may be connected to printer 534. Printer 534 enables a user with the capability to print information to a sheet of paper. CPU 526 may be connected to video camera 542. Video camera 542 enables video produced or captured by user to be recorded, processed and communicated by CPU 526.

CPU 526 may also be coupled to input/output interface 544 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 526 optionally may be coupled to network interface 546 which enables communication with an external device such as a database or a computer or telecommunications or internet network using an external connection shown generally as communication channel 516, which may be implemented as a hardwired or wireless communications link using suitable conventional technologies. With such a connection, CPU 526 might receive information from the network, or might output information to a network in the course of performing the method steps described in the teachings of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a “mean for” or “steps for” claim limitation implies that the broadest initial search on 35 USC § 112(6) (post AIA 112(f)) functional limitation would have to be conducted to support a legally valid Examination on that USPTO policy for broadest interpretation of “mean for” claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing pet entry system according to the present invention will be apparent to those skilled in the art. Various aspects of the invention have been described above by way of illustration, and the specific embodiments disclosed are not intended to limit the invention to the particular forms disclosed. The particular implementation of the pet entry system may vary depending upon the particular context or application. By way of example, and not limitation, the pet entry system described in the foregoing were principally directed to automated pet entry implementations; however, similar techniques may instead be applied to secured entry system or keyless entry system for the disabled who can't use the biometric or numeric access control systems, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A process executable by at least one or more processor(s) comprising the steps of:

determining, with a trigger device, if at least one of a touch sensor, proximity sensor, motion sensor, and button sensor has been activated, wherein the activation of said trigger device is based upon at least one of said touch sensor, proximity sensor, motion sensor, and button sensor having been touched, brushed and/or bumped into;

activating or waking a processor is derived from at least one of the touch sensor, proximity sensor, motion sensor, and button sensor being activated;

determining an elapsed time after at least one of the touch sensor, proximity sensor, motion sensor, and button sensor having been activated;

scanning for a wireless key signal from a pet tag, predicated on the activation of said trigger device;

receiving a wireless key signal from said pet tag;

validating and/or authenticating the wireless key signal received from said pet tag;

determining a distance of said pet tag to a wireless key receiver, with one or more RSSI parameter(s), predicated on the received wireless key signal being authenticated and/or valid;

determining if the distance of said pet tag is within a predetermined distance to said trigger device and wherein the wireless key signal is valid;

sending a door open or close command to a door controller, wherein the door open or close command is executed predicated on the pet tag being within a predetermined distance to said trigger device or within a detection-range of said trigger device;

determining an elapsed time of not receiving an authentic or valid wireless key signal;

ending the scanning for wireless key signal and going to a sleep mode after a predetermined amount of elapsed time is reached of not receiving an authentic or valid wireless key signal.

2. The process of claim 1, further comprising receiving, with said door controller, the door open or closed command, on the basis of the pet tag being within a predetermined distance or within a detection-range of said trigger device; and authenticating or validating the wireless key signal received from said pet tag upon receiving the door open command.

3. The process of claim 2, further comprising ignoring the received open command or do not open the door predicated on the received wireless key signal being invalid.

4. The process of claim 3, further comprising stopping or ending the wireless key signal scanning stemming from the received wireless key signal being invalid and after ignoring the open command.

5. The process of claim 4, further comprising going to sleep or low power mode stemming from the received wireless key signal being invalid and after ignoring the open command.

6. The process of claim 5, further comprising waiting for a triggering or activating signal while in sleep or low power mode, wherein bumping or touching said trigger device initiates a triggering or activating of said trigger device and/or said pet tag is within a detection-range zone of said trigger device.

7. The process of claim 1, further comprising determining the distance of the pet tag to said trigger device with one or more RSSI parameter, wherein the one or more RSSI parameter is/are included in the wireless key signal.

8. The process of claim 7, further comprising comparing the determined distance with a pre-stored allowable distance range and the received wireless key signal is authenticated and/or valid.

9. The process of claim 8, further comprising disregarding or discarding the received wireless key signal if the determined distance does not match the pre-stored allowable distance range or the distance is not within the allowable or predetermined distance range.

10. The process of claim 9, further comprising scanning for a wireless key signal and opening the door upon determining the received wireless key signal is within the allowable or predetermined distance range or within-detection-range.

11. The process of claim 9, further comprising determining an elapsed time of not receiving a wireless key signal upon disregarding or discarding the received wireless key signal when the determined distance is not within the predetermined distance range.

12. The process of claim 11, further comprising stopping or ending the wireless key signal scanning upon reaching a set elapsed time of not receiving a wireless key signal and after disregarding or discarding the initially received wireless key signal.

13. An automated entry system comprising:

means for providing an ingress and/or egress for a pet;

means for detecting a presence of a pet;

means for identifying the pet;

means for attaching said pet identifying means to the pet;

means for initiating an activation of said pet presence detecting means;

wherein an activation of said pet detecting means comprises at least one of bumping, brushing and touching of said means for initiating an activation of said pet presence detecting means;

wherein said pet identifying means is within a detection zone of said pet detecting means;

wherein said pet identifying means comprises means for communicating with said pet presence detecting means;

wherein said means for communicating include;

means for processing wireless key signals from said pet identifying means;

means for scanning for wireless key signals;

means for receiving wireless key signals; and means for validating or authenticating the wireless key signal received;

means for determining a distance of said pet detecting means and pet identifying means, with one or more RSSI parameter(s), established on the wireless key signal being valid;

means for receiving a door open or close command, wherein the door open or close command is received predicated on said pet detecting means and pet identifying means being within a predetermined proximity range;

wherein said pet detecting means is configured to determine an elapsed time of not receiving an authentic or valid wireless key signal; and means for ending the scanning for wireless key signals after a predetermined amount of elapsed time is reached of not receiving an authentic or valid wireless key signal.

14. A process executable with one or more processors comprising the steps of:

determining, with a trigger device, if at least one of a touch sensor, motion sensor, and button sensor has been triggered or activated;

activating or waking at least one processor if at least one of the touch sensor, proximity sensor, motion sensor, and button sensor has been triggered or activated;

determining an elapsed time after at least one of the touch sensor, motion sensor, and button sensor has been triggered and/or activated;

scanning for a wireless key signal from a tag, on the basis of the activation of said trigger device;

receiving the wireless key signal from the tag;

validating or authenticating the wireless key signal received from the tag;

evaluating, with one or more RSSI parameter(s), a distance of the tag to a wireless key receiver, wherein the one or more RSSI parameter(s) is/are included in the received wireless key signal;

confirming if the distance of the tag is within a predetermined distance or proximity range to said wireless key receiver predicated on the received wireless key signal being valid;

sending a door open command to a door controller in light of the tag being within the predetermined distance or proximity range to said wireless key receiver; and determining an elapsed time of not receiving an authentic or valid wireless key signal; and ending the scanning for wireless key signal after a predetermined amount of elapsed time is reached of not receiving an authentic or valid wireless key signal.

15. The process of claim 14, further comprising:

receiving, with said door controller, the door open command on the basis of the tag being within the predetermined distance or proximity range to said wireless key receiver; and authenticating or validating the wireless key signal received from said pet tag upon receiving the door open command.

16. The process of claim 14, further comprising determining an elapsed time of not receiving a wireless key signal from said tag after at least one of the touch sensor, proximity sensor, motion sensor, and button has been activated.

17. The process of claim 16, further comprising stopping or ending the wireless key signal scanning if the elapsed time of not receiving a wireless key signal has reached a predetermined maximum non-signal elapsed time.

18. The process of claim 14, further comprising said door controller issuing a close command if the wireless key signal goes out of said predetermined distance or proximity detection range.

19. The process of claim 14, further comprising waiting for trigger or activating signal while in sleep or low power mode after ending the scanning for wireless key signal.

20. The process of claim 14, further comprising: at least one of ignoring the received open command and do not open the door stemming from the wireless key signal being invalid.

* * * * *